(12) United States Patent
Chen

(10) Patent No.: US 9,607,449 B1
(45) Date of Patent: Mar. 28, 2017

(54) CONTROL OF WIRELESS COMMUNICATION CHANNELS FOR A VEHICLE TELEMATICS UNIT

(71) Applicant: General Motors LLC, Detroit, MI (US)

(72) Inventor: Bonnie Chen, Grapevine, TX (US)

(73) Assignee: General Motors LLC, Detroit, MI (US)

( * ) Notice: Subject to any disclaimer, the term of this patent is extended or adjusted under 35 U.S.C. 154(b) by 0 days.

(21) Appl. No.: 15/004,704

(22) Filed: Jan. 22, 2016

(51) Int. Cl.
*G07C 5/00* (2006.01)

(52) U.S. Cl.
CPC .................................. *G07C 5/008* (2013.01)

(58) Field of Classification Search
CPC ..................................................... G07C 5/008
See application file for complete search history.

(56) References Cited

U.S. PATENT DOCUMENTS

| 6,745,151 | B2* | 6/2004 | Marko | G07C 5/0808 |
| | | | | 701/31.4 |
| 6,956,501 | B2* | 10/2005 | Kitson | H04Q 9/02 |
| | | | | 340/539.24 |
| 8,989,068 | B1* | 3/2015 | Ramamurthy | H04W 72/02 |
| | | | | 370/310 |
| 9,082,239 | B2* | 7/2015 | Ricci | B60Q 1/00 |
| 2005/0038598 | A1* | 2/2005 | Oesterling | B60R 25/2018 |
| | | | | 701/521 |
| 2007/0173993 | A1* | 7/2007 | Nielsen | G07C 5/085 |
| | | | | 701/33.4 |
| 2010/0097178 | A1* | 4/2010 | Pisz | B60R 16/037 |
| | | | | 340/5.72 |
| 2012/0253861 | A1* | 10/2012 | Davidson | G06Q 10/08 |
| | | | | 705/7.11 |
| 2013/0116882 | A1* | 5/2013 | Link, II | G01C 21/3446 |
| | | | | 701/31.4 |
| 2015/0365981 | A1* | 12/2015 | Thanayankizil | H04W 4/008 |
| | | | | 455/41.2 |

* cited by examiner

*Primary Examiner* — Thomas Tarcza
*Assistant Examiner* — Alex C Dunn
(74) *Attorney, Agent, or Firm* — Christopher DeVries; Reising Ethington P.C.

(57) ABSTRACT

A vehicle telematics system and a method for controlling access to a plurality of wireless communication channels between the telematics system and on-board vehicle systems and mobile communications devices is provided. The telematics system includes one network interface connected to a telecommunications network and another network interface connected to one or more on-board vehicle systems and mobile communications devices to permit the on-board vehicle systems and communications devices to access the telecommunications network. The telematics system further includes a controller that receives a request by an on-board vehicle system to establish a communication channel, determines whether all of the channels are in active use, and, if so, identifies a low priority application of one of the on-board vehicle systems or communications devices using one of the active channels and then severs the channel and establishes the communication channel between the telematics system and requesting vehicle system.

16 Claims, 2 Drawing Sheets

CONTROL OF WIRELESS COMMUNICATION CHANNELS FOR A VEHICLE TELEMATICS UNIT

TECHNICAL FIELD

The present invention relates to a vehicle telematics system and a method for controlling the system. In particular, the present invention relates to a system and method in which use of available communication channels between the telematics system and on-board vehicle systems and mobile communications devices is prioritized and controlled to ensure availability for high priority systems.

BACKGROUND

Many modern vehicles include a telematics system that enables voice and/or data communication over a wireless carrier system. The system may be used to provide various services including navigation, telephony, emergency assistance, vehicle diagnostics and infotainment among other services. The telematics system functions as a wireless access point to permit the exchange of information between the wireless carrier system and various vehicle systems. The telematics system can also be used to exchange information between the wireless carrier system and mobile communication devices used by vehicle occupants such as cellular phones, tablet or laptop computers and the like.

Due to limitations associated with bandwidth and communication protocols, telematics systems typically only communicate with a limited number of vehicle systems and/or mobile communication devices in the vehicle. As vehicle functionality increases, however, an ever growing number of vehicle systems require or would benefit from access to the wireless carrier system through the telematics system. Combined with the increased use of personal mobile communication devices, the possibility exists that a vehicle system may not be able to access the wireless carrier system when needed. Certain vehicle systems that currently exist or are under development rely on real time data and the inability to obtain such data may negatively impact the functionality of effectiveness of the system. For example, certain autonomous driving systems require access to the wireless carrier system to obtain traffic and/or map data used by the system. If the autonomous driving system cannot access the wireless carrier system, the system may have to rely on outdated information.

SUMMARY

According to an embodiment of the invention, there is provided a vehicle telematics system including a first network interface configured for connection to a telecommunications network. The system further includes a second network interface that communicates with the first network interface and that is configured for wireless connection to one or more of a plurality of on-board vehicle systems and one or more of a plurality of mobile communications devices to permit the one or more of the plurality of on-board vehicle systems and the one or more of the plurality of mobile communications devices to access the telecommunications network via the first network interface. The telematics system further includes a controller configured to receive a request by a first on-board vehicle system of the plurality of on-board vehicle systems to establish a first communication channel between the second network interface and the first on-board vehicle system. The controller is further configured to determine a number of communication channels between the second network interface and the plurality of on-board vehicle systems and between the second network interface and the plurality of mobile communications devices that are in active use. The controller is further configured to identify, if the number meets a predetermined condition relative to a predetermined number, a low priority application of one of a second on-board vehicle system of the plurality of on-board vehicle systems and a first mobile communications device of the plurality of mobile communications devices connected to the second network interface through a second communication channel. The controller is further configured to sever the second communication channel and establish the first communication channel between the second network interface and the first on-board vehicle system.

According to another embodiment of the invention, there is provided a method for controlling access to a plurality of wireless communication channels between a vehicle telematics system and a plurality of on-board vehicle systems and a plurality of mobile communications devices. The method includes receiving a request by a first on-board vehicle system of the plurality of on-board vehicle systems to establish a first communication channel between the vehicle telematics system and the first on-board vehicle system. The method further includes determining a number of communication channels between the vehicle telematics system and the plurality of on-board vehicle systems and between the vehicle telematics system and the plurality of mobile communications devices that are in active use. The method further includes identifying, if the number meets a predetermined condition relative to a predetermined number, a low priority application of one of a second on-board vehicle system of the plurality of on-board vehicle systems and a first mobile communications device of the plurality of mobile communications devices connected to the vehicle telematics system through a second communication channel. The method further includes severing the second communication channel and establishing the first communication channel between the vehicle telematics system and the first on-board vehicle system.

According to another embodiment of the invention, there is provided a method for controlling a vehicle telematics system of a vehicle. The vehicle telematics system is configured for cellular data communication with a wireless carrier system and is configured to provide a wireless access point within the vehicle that provides a plurality of wireless communication channels for use by a plurality of local wireless devices that include on-board vehicle systems and mobile communications devices located within the vehicle. The method includes receiving a request by a first local wireless device of the plurality of local wireless devices to establish a first communication channel with the wireless access point wherein the first local wireless device is a first one of the on-board vehicle systems that requires data communication with the wireless carrier system via the wireless access point. The method further includes determining that all of the plurality of wireless communication channels of the wireless access point are in active use, wherein each of the plurality of wireless communication channels has been established between the wireless access point and a different one of the plurality of local wireless devices. The method further includes terminating one of the plurality of wireless communication channels that is in active use, thereby making the one wireless communication channel available for subsequent use by the first on-board vehicle system. The method further includes establishing the first communication channel between the first on-board vehicle system and wireless access point using the one wireless communication channel.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION OF THE ILLUSTRATED EMBODIMENT(S)

The vehicle telematics system and method for controlling the system described below provide a means for controlling access to and use of a limited number of communication channels between the telematics system and on-board vehicle systems and mobile communication devices. In particular, the system and method enable prioritization among vehicle systems and communications devices accessing the telematics system to insure availability for high priority systems. In this manner, vehicle systems that depend on real time access to the telematics unit for driver-related or operation critical tasks are ensured better access.

Figure 1:
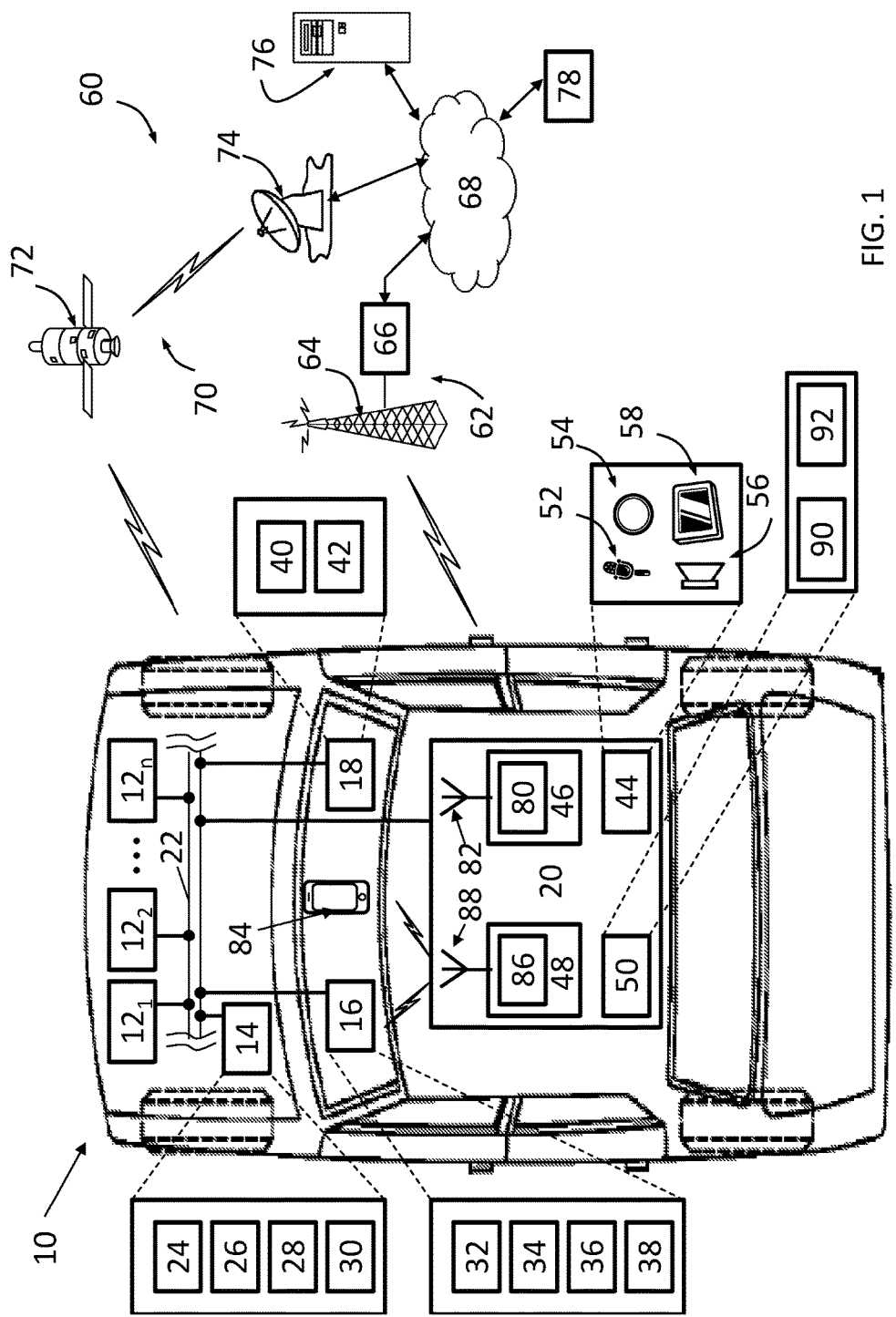
FIG. 1 is a schematic drawing illustrating a vehicle incorporating one embodiment of a telematics system in accordance with the present teachings.

Referring now to the drawings wherein like reference numerals are used to identify identical components in the various views, FIG. 1 illustrates a vehicle 10 incorporating one embodiment of a telematics system in accordance with the present teachings. Vehicle 10 is depicted in the illustrated embodiment as a passenger car, but it should be appreciated that the telematics system and method disclosed herein could be used or implemented in a wide variety of vehicles including motorcycles, trucks, sports utility vehicles (SUVs), recreational vehicles (RVs), marine vessels, aircraft, etc. Vehicle 10 may include a variety of on-board vehicle systems including, but not limited to, those used to control vehicle 10 such as vehicle control modules $12_1 \ldots 12_n$ and adaptive cruise control system 14 and those used to provide services to occupants of vehicle 10 such as navigation system 16 and infotainment system 18. Vehicle 10 may further include a telematics system 20 in accordance with the present teachings that interacts with one more of the on-board vehicle systems including modules $12_1 \ldots 12_n$ and systems 14, 16, 18.

Vehicle control modules $12_1 \ldots 12_n$ comprise electronic hardware components that are located throughout the vehicle and typically receive input from one or more sensors, cameras, wireless communication devices (handling communications between vehicle 10 and remote servers, other vehicles, and other nearby wireless communication devices) and use the sensed and collected inputs to perform diagnostic, monitoring, control, reporting and/or other functions. Each of the modules $12_1 \ldots 12_n$ is preferably connected by a communications bus 22 to other modules $12_1 \ldots 12_n$ as well as to the telematics system 20, and can be programmed to run vehicle system and subsystem diagnostic tests. As examples, one of modules $12_1 \ldots 12_n$ can be an engine control module (ECM) that controls various aspects of engine operation such as fuel ignition and ignition timing, another of modules $12_1 \ldots 12_n$ can be a powertrain control module that regulates operation of one or more components of the vehicle powertrain, and another of modules $12_1 \ldots 12_n$ can be a body control module that governs various electrical components located throughout the vehicle, like the vehicle's interior and exterior lights, power door locks, power windows, power mirrors and other components. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned modules are only examples of some of the modules that may be used in vehicle 10, as numerous others are also possible.

Adaptive cruise control system 14 controls components of the vehicle power system (e.g., the throttle valve of a vehicle with an internal combustion engine or the power controller regulating power delivery from a vehicle battery to an electric motor in an electric vehicle) and vehicle brake system to maintain a predetermined vehicle speed and/or vehicle position relative to other vehicles. System 14 may include an user interface 24, vehicle interface 26, communications module 28 and controller 30. User interface 24 is configured to receive inputs from a driver of vehicle 10 including a desired vehicle speed and desired position relative to other vehicles and to generate outputs to the driver or other vehicle occupants including confirmation of the inputs. The interface 24 may include any combination of hardware, software and/or other components that enable the driver to exchange information or data with the vehicle 10. The interface 24 typically includes touch screen displays, pushbuttons or other mechanisms on the instrument panel (or dashboard) or steering column. Vehicle interface 26 is configured to receive input signals from a plurality of sensors used to detect operating conditions of the vehicle including, for example, wheel speed sensors that are coupled to each wheel of vehicle 10 and separately report the rotational velocity of each wheel and sensors that are used to detect the position of other vehicles on the road including, for example, light detection and ranging (LIDAR) devices, ultrasonic devices, radio detection and ranging (RADAR) devices, and vision device (e.g., camera, etc.) used in vehicle collision avoidance systems such as a forward collision warning systems, front automatic braking systems, forward or rear park assist systems, lane departure warning systems, side blind zone alert systems, side or rear object detection systems, or rear automatic braking systems. Interface 26 is also configured to transmit output signals to components of the vehicle power system and vehicle brake system for use in controlling the vehicle power system and vehicle brake system. Communications module 28 may include any combination of hardware, software and/or other components that enable wireless voice and/or data communication between system 14 and systems external to vehicle 10 or internal to vehicle 10 such as telematics system 20. Module 28 may, for example, include a radio transceiver configured for short range wireless communication with telematics system 20 using short-range wireless technologies such as Wi-Fi (IEEE 802.11), WiMAX, Wi-Fi direct, Bluetooth, Zigbee, near field communication (NFC), etc. in order to obtain geographic information such as updated maps used in predictive control. Controller 30 is configured to generate control signals for the vehicle power system and vehicle brake system responsive to inputs received through the user interface 24, vehicle interface 26 and communications module 28. The controller 30 may include various electronic processing devices (e.g., a microprocessor, a microcontroller, an application specific integrated circuit (ASIC), etc.) and memory devices.

Navigation system 16 provides directional guidance to the vehicle occupants and related information. System 16 may include a user interface 32, a GPS receiver 34, a communications module 36 and a controller 38. User interface 32 is configured to enable the vehicle occupants to input information including intended destinations and receive outputs such as audio or visual indications of travel directions, warnings, and information on local attractions such as restaurants, lodging and tourist sites. The interface 32 may again include any combination of hardware, software and/or other components that enable the driver to exchange information or data with system 16 and may include, for example, a touch screen display and speakers. Global positioning system (GPS) receiver 34 is configured to receive signals from GPS satellites and process those signals to determine the current location of vehicle 10. GPS receiver 34 may be housed within navigation system 16 or may be disposed elsewhere within vehicle 10 and send signals to system 16 over the vehicle communications bus 22. Communications module 36 may include any combination of hardware, software and/or other components that enable wireless voice and/or data communication between system 16 and systems external to vehicle 10 or internal to vehicle 10 such as telematics system 20. Module 36 may, for example, include a radio transceiver configured for short range wireless communication with telematics system 20 using short-range wireless technologies such as Wi-Fi (IEEE 802.11), WiMAX, Wi-Fi direct, Bluetooth, Zigbee, near field communication (NFC), etc. in order to obtain geographic information such as updated maps. Controller 38 generates the outputs referenced above in response to destination information entered at the user interface 32, location information from the GPS receiver 34, and geographic information obtained through telematics system 20 through communications module 36. It should be understood that various navigation services can be provided using system 16 and/or telematics system 20 wherein the position information generated by GPS receiver 34 may be sent through telematics system 20 to a remote location for purposes of providing the vehicle 10 with navigation maps, map annotations (points of interest, restaurants, road traffic congestion or accident information, etc.), route calculations, and the like. The position information generated by GPS receiver 34 can also be supplied to a call center for use in providing emergency or roadside assistance or to a remote computer system for various purposes such as fleet management.

Infotainment system 18 provides information and entertainment to the driver and other occupants of vehicle 10. System 18 may include a user interface 40 and a communications module 42. User interface 40 may include any combination of hardware, software and/or other components that enable a vehicle occupant to exchange information or data with the vehicle 10. This includes, for example, input components like a touch-screen display, a microphone, a keyboard, a pushbutton or other control where user interface 40 receives information from a vehicle occupant, as well as output components like a visual display, an instrument panel, or an audio system where user interface 40 provides information to the vehicle occupant. In some cases, user interface 40 includes components with both input and output capabilities, such as visual and audible interfaces. The audible interface may be part of an automated voice processing system that uses voice-recognition and/or other human-machine interface (HMI) technology. User interface 40 may be mounted on a dashboard (e.g., with a driver information center (DIC)); it may be projected onto a windshield (e.g., with a heads-up display); it may be integrated within an existing audio system; or it may simply include an electronic connection or port for connecting with a laptop or other computing device, to cite a few examples. Communications module 42 may include any combination of hardware, software and/or other components that enable wireless voice and/or data communication between system 18 and systems external to vehicle 10 or internal to vehicle 10 such as telematics system 20. Module 42 may, for example, include a radio transceiver configured for short range wireless communication with telematics system 20 using short-range wireless technologies such as Wi-Fi (IEEE 802.11), WiMAX, Wi-Fi direct, Bluetooth, Zigbee, near field communication (NFC), etc.

Telematics system 20 can be an OEM-installed (embedded) or aftermarket device that is installed in the vehicle 10 and that enables wireless voice and/or data communication over a wireless carrier system and via wireless networking. System 20 may enable communication between vehicle 10 and a call center, other telematics-enabled vehicles, or some other entity or device. System 20 can therefore be used to provide a diverse range of vehicle services that involve wireless communication to and/or from the vehicle 10. Such services include: turn-by-turn directions and other navigation-related services that are provided in conjunction with the GPS-based vehicle navigation system 16; airbag deployment or collision notification and other emergency or roadside assistance-related services that are provided in response to signals received from vehicle control modules $12_1 \ldots 12_n$; diagnostic reporting using information obtained from vehicle control modules $12_1 \ldots 12_n$ or diagnostic modules; and infotainment-related services where music, webpages, movies, television programs, videogames and/or other information is downloaded by infotainment system 18 and is stored for current or later playback. The above-listed services are by no means an exhaustive list of all of the capabilities of telematics system 20, but are simply an enumeration of some of the services that the telematics system 20 is capable of offering. System 20 may include a user interface 44, a pair of network interfaces 46, 48 and a controller 50.

User interface 44 enables vehicle occupants to access or initiate various services through telematics system 20 and to provide and receive information from a call center, other telematics-enabled vehicles or other entity or device. Interface 44 may include any combination of hardware, software and/or other components that enable a vehicle occupant to exchange information or data through system 20. The interface 44 may therefore include an input components such as a microphone 52, one or more pushbuttons 54, a touch-screen display or other input device where user interface 44 receives information from a vehicle occupant, as well as output components like an audio system 56, a visual display 58, or an instrument panel, where user interface 44 provides information to the vehicle occupant. Microphone 52 provides audio input to the telematics system 20 to enable the driver or other occupant to provide voice commands and carry out hands-free calling. For this purpose, it can be connected to an on-board automated voice processing unit utilizing human-machine interface (HMI) technology known in the art. The pushbutton(s) 54 allow manual user input into the telematics system 20 to initiate wireless telephone calls and provide other data, response, or control input. Separate pushbuttons 54 can be used for initiating emergency calls versus regular service assistance calls. The audio system 56 provides audio output to a vehicle occupant and can be a dedicated, stand-alone system or part of the primary vehicle audio system providing AM, FM and satellite radio, CD, DVD and other multimedia functionality. This functionality can be provided in conjunction with or independent of the infotainment system 18 described above. Visual display 58 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation. Some components of the interface 44, such as microphone 52 and pushbuttons 54 may be connected directly to the telematics unit whereas others are indirectly connected using one or more network connections, such as vehicle communications bus 22. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few. Some or all components of user interface 44 may be mounted on the vehicle's rear view mirror.

Network interface 46 is configured for connection to a telecommunications network 60. Network 60 may comprise the public internet, a local area network (LAN), wide area network (WAN), virtual private network (VPN) or other form of telecommunications network. Network 60 may include a wireless carrier system such as a cellular telephone system 62 that includes a plurality of cell towers 64 or cellular base stations (only one shown), one or more 2G/3G mobile switching centers (MSCs) or 4G+ Evolved Packet Core (EPC) systems 66 and other networking components required to connect wireless carrier system with a land-based telecommunications network 68. Each cell tower 64 includes sending and receiving antennas and a base station, with the base stations from different cell towers being connected to the MSC/EPC 66 either directly or via intermediary equipment such as a base station controller. System 62 can implement any suitable communications technology, including for example, analog technologies such as AMPS, or the newer digital technologies such as CDMA (e.g., CDMA2000) or GSM/GPRS/UMTS/LTE. As an alternative or in addition to cellular telephone system 62, the wireless carrier system may comprise a satellite communication system 70 that provides uni-directional or bi-directional communication with the vehicle 10. System 70 may include communication satellites 72 and an uplink transmitting station 74. Uni-directional communication can be, for example, satellite radio services, wherein programming content (news, music, etc.) is received by transmitting station 74, packaged for upload, and then sent to the satellite 72, which broadcasts the programming to subscribers. Bi-directional communication can be, for example, satellite telephony services using satellite 72 to relay telephone communications between the vehicle 10 and station 74.

Using the wireless carrier network, telematics system 20 may be connected to network 68 and, through network 68, to various computing devices 76 and/or to a call center 78. Network 68 may be a conventional land-based telecommunications network that is connected to one or more landline telephones and connects the wireless carrier system to computing devices 76 and call center 78. For example, network 68 may include a public switched telephone network (PSTN) such as that used to provide hardwired telephony, packet-switched data communications, and the Internet infrastructure. One or more segments of network 68 could be implemented through the use of a standard wired network, a fiber or other optical network, a cable network, power lines, other wireless networks such as wireless local area networks (WLANs), or networks providing broadband wireless access (BWA), or any combination thereof. Computing devices 76 can be used for various purposes and may comprise, for example, service center computers where diagnostic information and other vehicle data can be uploaded from the vehicle via the telematics system 20, client computers used by the vehicle owner or other subscriber for such purposes as accessing or receiving vehicle data or to setting up or configuring subscriber preferences or controlling vehicle functions, file servers to or from which vehicle data or other information is provided, web servers, or network address servers. Call center 78 may provide vehicle 10 with a number of different system back-end functions including connections to human advisors, an automated voice response system, databases, servers and the like used in providing, for example, emergency or roadside assistance services and vehicle diagnostic services.

According to one embodiment, network interface 46 is used for cellular communication according to either GSM, CDMA, UMTS or LTE standards and therefore includes a standard cellular chipset for voice communications like hands-free calling, a wireless modem (not shown) for data transmission, and a radio transceiver 80 that transmits signals to and receives signals from a dual antenna 82 for wireless communication with network 62. It should be appreciated that the wireless modem can either be implemented through software that is stored in a memory in the telematics system 20 and is executed by controller 50, or it can be a separate hardware component located internal or external to telematics system 20. The modem can operate using any number of different standards or protocols such as LTE, UMTS, EVDO, CDMA, GPRS, and EDGE. Transceiver 80 may communicate with cell towers 64 through antenna 82 using communication topologies including frequency, time and code division multiple access topologies (i.e. FDMA, TDMA, CDMA). System 20 establishes a communications channel (a voice channel and/or a data channel) with the wireless carrier system so that voice and/or data transmissions can be sent and received over the channel. Data can be sent either via a data connection, such as via packet data transmission over a data channel, or via a voice channel using techniques known in the art. For combined services that involve both voice communication (e.g., with a live advisor or voice response unit at the call center 78) and data communication (e.g., to provide GPS location data or vehicle diagnostic data to the call center 78), the system 20 can utilize a single call over a voice channel and switch as needed between voice and data transmission over the voice channel, and this can be done using techniques known to those skilled in the art. When used for packet-switched data communication such as TCP/IP, telematics system 20 can be configured with a static IP address or can set up to automatically receive an assigned IP address from another device on the network such as a router or from a network address server.

Network interface 48 communicates with network interface 46 and is configured for wireless connection to one or more local wireless devices in or near vehicle 10 including (i) on-board vehicle systems such as modules $12_1 \ldots 12_n$ and systems 14, 16, 18, and (ii) mobile communications devices such as cellular phone 84 to permit the on-board vehicle systems and mobile communications devices to access telecommunications network 60 via network interface 46. In this manner, telematics system 20 functions as a wireless access point within vehicle 10 (i.e. a hotspot) for on-board vehicle systems such as modules $12_1 \ldots 12_n$ and systems 14, 16, 18, and mobile communications devices, such as phone 84 to access network 60. In addition to cellular phones, mobile communication devices that may request access to network 60 may include, for example, tablet or laptop computers or any other device that is not mechanically connected to vehicle 10 and is configured for wireless communication with a telecommunications network. In general, the mobile communication devices may include hardware, software, and/or firmware enabling cellular telecommunications and communications via short-range wireless communication (e.g., Wi-Fi Direct and Bluetooth) as well as other mobile device applications. The hardware of the mobile communications device may include a processor and memory (e.g., non-transitory computer readable medium configured to operate with the processor) for storing the software, firmware, etc. and the processor and memory may enable various software applications, which may be preinstalled or installed by the user (or manufacturer) (e.g., having a software application or graphical user interface or GUI). The mobile communications devices may further include various user interface elements includes a display, a keypad (e.g., push button and/or touch screen), a microphone, one or more speakers, motion-detection sensors (such as accelerometers, gyroscopes, etc.), and a camera. Network interface 48 may comprise a wireless network interface controller having a radio transceiver 86. Transceiver 86 may be similar to transceiver 82, but may be configured to short range wireless communication using short-range wireless technologies such as Wi-Fi (IEEE 802.11), WiMAX, Wi-Fi direct, Bluetooth, Zigbee, near field communication (NFC), etc. Transceiver 86 may transmit and receive signals using an antenna 88.

Controller 50 is provided to control and manage communications between network interfaces 46, 48. In accordance with one aspect of the present teachings, controller 50 prioritizes among on-board vehicle systems and mobile communication devices in vehicle 10 to control access to the limited number of communication channels available with network interface 48. Controller 50 may include a variety of electronic processing devices, memory devices, input/output (I/O) devices, and/or other known components, and may perform various control and/or communication related functions. In an exemplary embodiment, controller 50 includes an electronic memory device 90 that stores various look up tables or other data structures and software programs, etc. Controller 50 may also include an electronic processing device 92 (e.g., a microprocessor, a microcontroller, an application specific integrated circuit (ASIC), etc.) that executes instructions for software, firmware, programs, algorithms, scripts, etc. that are stored in memory device 90. For this purpose, memory device 90 may be a non-volatile computer readable memory that provides non-transient storage of programming and/or data for use by processing device 92. Controller 50 may be a dedicated controller used only for telematics systems 20 or can be shared with other vehicle systems. Controller 50 may be electronically connected to other vehicle devices, modules and systems via vehicle communications bus 22 or other communication means and can interact with them when required.

Figure 2:
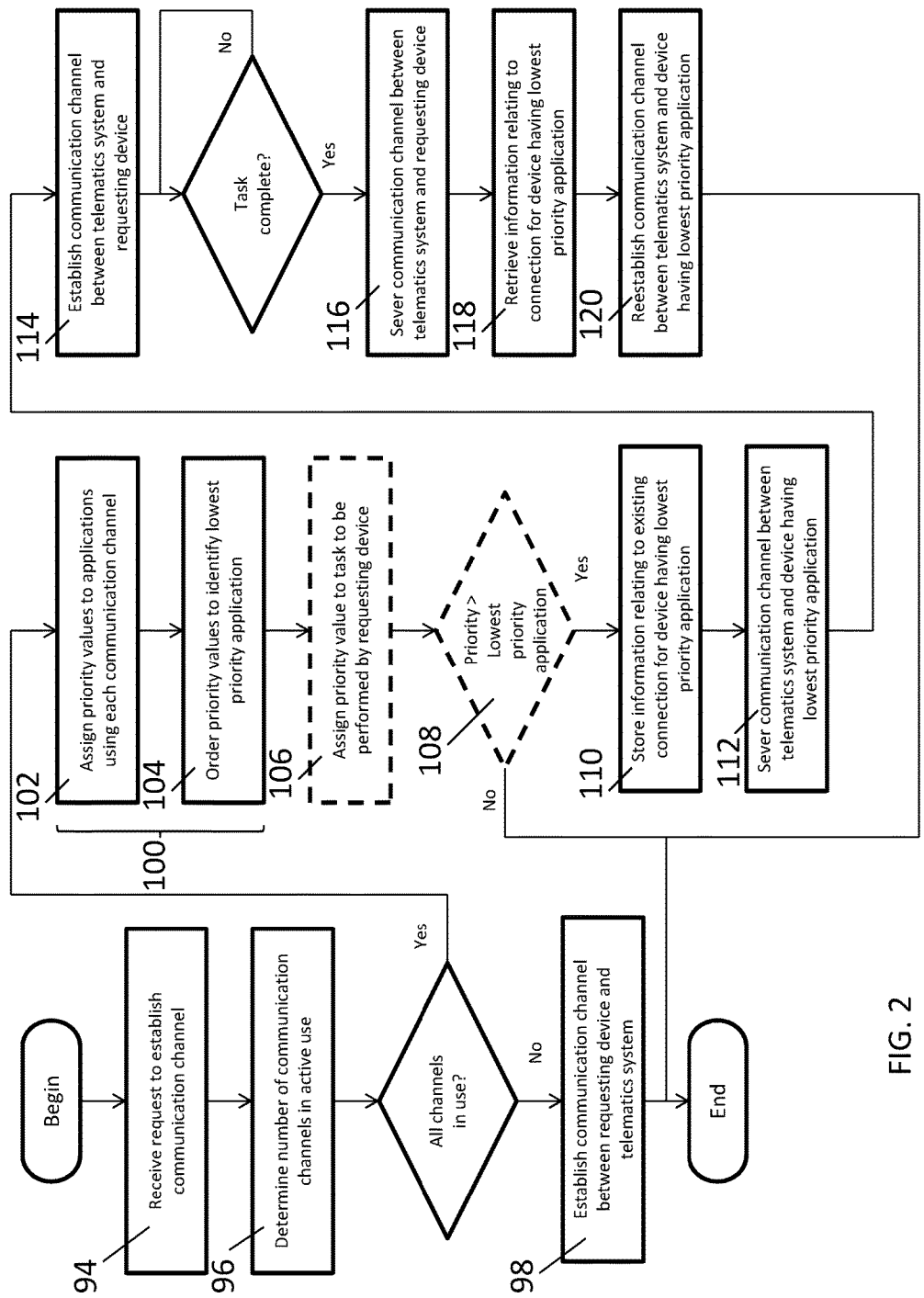
FIG. 2 is a flowchart diagram illustrating one embodiment of a method for controlling access to a plurality of wireless communication channels between a vehicle telematics system and on-board vehicle systems and mobile communications devices in accordance with the present teachings.

In accordance with one embodiment controller 50 is configured with appropriate programming instructions or code (i.e., software) to perform several steps in a method for controlling access to a plurality of wireless communication channels between telematics system 20 and on-board vehicle systems such as modules $12_1 \ldots 12_n$ and systems 14, 16, 18, and mobile communications devices such as cellular phone 84. The code may be stored in memory device 90 of controller 50 and may be uploaded to memory device 90 from a conventional computer storage medium. Referring now to FIG. 2, the method may include the step of receiving 94 a request by a local wireless device to establish a communication channel between the device and the wireless access point provided by telematics system 20. In accordance with the present teachings, the local wireless device may comprise an on-board vehicle system such as one of modules $12_1 \ldots 12_n$ or systems 14, 16, 18 that requires data communication with the wireless carrier system of telecommunications network 60 via the wireless access point. The request may be received through network interface 48.

The method may continue with the step 96 of determining the number of communication channels between the wireless access point of telematics system 20 and other on-board vehicle systems and/or mobile communications devices that are already in active use. Because of bandwidth limitations, communication protocols, and other factors, telematics system 20 may be able to establish only a limited number of communication channels with on-board vehicle systems and mobile communications devices thereby limiting the number of on-board vehicle systems and mobile communication devices that can access telecommunications network 60 at any moment in time. Step 96 is performed in order to determine whether all of the available wireless communication channels with the wireless access point are in active use. Controller 50 monitors and controls the connections between network interface 48 and on-board vehicle systems and mobile communication devices and therefore is able to identify the communication channels that are in active use. Controller 50 may, for example, determine the number of communication channels in use by counting internet protocol addresses accessed through system 20 or simply by monitoring the number of communication ports in use. Controller 50 can then determine whether the number of channels that are in active use meets a predetermined condition relative to a predetermined number. For example, controller 50 can determine whether the number of channels in active use equals a predetermined maximum number of channels.

If all of the available communication channels are not in active use, the method may continue with the step 98 of establishing a connection between the requesting system or device and telematics system 20. If, however, all of the available communication channels are in active use, controller 50 may perform several actions to prioritize and control use of the available communication channels. Certain on-board vehicle systems may require timely access to telecommunications network 60 to function properly and effectively. Elements of adaptive cruise control system 14 or navigation system 16, for example, may require access to network 60 to download current maps for use in instructing the driver and/or automated driving. When all of the available communication channels are in use, controller 50 may therefore perform the step 100 of identifying a low priority application of one of the on-board vehicle systems and mobile communications device already connected to the vehicle telematics system 20.

Step 100 may involve several substeps. In substep 102, controller 50 assigns, for each of the communications channels that is in active use, a priority value for an application of the on-board vehicle system or mobile communications device that is using the communication channel. Controller 50 may use a variety of criteria in assigning priority values to the applications being performed by the on board vehicle systems and the mobile communication devices. For example, controller 50 may determine whether any of the on-board vehicle systems and mobile communications devices are inactive (a communication channel is generally maintained even when the on-board vehicle system or mobile communication device is inactive) and may assign a low priority value to those systems and devices that are inactive. Controller 50 may also determine an internet protocol address from which each on-board vehicle system or mobile communication device is accessing data. In particular, controller 50 may determine internet protocol addresses associated with computing devices 76 or a device associated with call center 78 or another device in an effort to prioritize use. Based on the information associated with those internet protocol addresses (e.g., geographic location of the device 76, type of content provided by the device 76), controller 50 may assign priority values. Controller 50 may also determine the type of content which the on-board vehicle system or mobile communication device is sending or receiving through the communication channel. Controller 50 may, for example, identify those communication channels that are carrying streaming video and assign a higher or lower priority to applications that are sending or receiving streaming video relative to other content. It should be understood that the above criteria are exemplary only. Other potential criteria include URLs (uniform resource locators) in requests from the on-board vehicle system or mobile communication devices or the type of application/service being performed. It should also be understood that controller 50 may employ multiple criteria and may also apply different weights to each criteria. In one potential embodiment, services relating to safety and security are assigned higher priority values than those relating to business or entertainment. Further, among business and entertainment services, priority may be assigned from highest priority to lowest priority to real-time streaming services (e.g., VoIP calls, video calls, video streaming, online gaming, etc.), internet browsing, email communication, chats and file transfers. Once controller 50 has assigned priority values to the applications performed by each on-board vehicle system or mobile communication device using a communication channel, controller 50 may perform the substep 104 of ordering the priority values to determine the lowest priority application.

In some embodiments of the invention, controller 50 may assume that the local wireless device making a request to establish a communication channel with the wireless access point provided by telematics system 20 should have a higher priority than one of the existing users of the communication channels. In other embodiments, however, controller 50 may consider the intended use of the requesting device in determining whether the requesting device should have priority over existing users. Therefore, controller 50 may perform the steps 106, 108 of assigning a priority value to the task to be performed by the requesting device and comparing that priority value against the priority value associated with the previously identified low priority application. If the priority value associated with the task to be performed by the requesting device meets a predetermined condition relative to the priority value associated with the low priority application (e.g., is lower), then controller 50 may reject the request to establish a communication channel with the telematics system 20 and maintain the existing communication channels.

If controller 50 determines that a communication channel should be established between the requesting device and the telematics system 20 (whether automatically or based on a priority comparison in step 108), controller 50 may perform several steps to terminate one of the communication channels that is in active use in order to make the channel available for subsequent use by the requesting device. In step 110, controller 50 may store a set of information relating to the connection between telematics system 20 and the on-board vehicle system or mobile communications device performing the low priority application identified earlier. Controller 50 may record standard connection information including device identifiers, internet protocol and/or media access control (MAC) addresses, communication protocol information and information relating to the point in time/process in a data stream at which communication will be terminated (e.g., the point in a video stream). This information may be stored in memory device 90. In steps 112, 114, controller 50 severs the communication channel between the wireless access point of the telematics system 20 and the on-board device or mobile communications device performing the low priority application and then establishes a communication channel between the wireless access point of the telematics system 20 and the requesting device using that same communication channel.

In many cases, it is anticipated that the period for which access to telecommunications network 60 through telematics system 20 is requested will be relatively short. Accordingly, controller 50 may perform several steps to reestablish the connection between telematics system 20 and the on-board vehicle system or mobile communications device performing the low priority application once the need for access to network 60 by the requesting device ends. In particular, controller 50 may perform the step 116 of severing the communication channel between telematics system 20 and the requesting device after the task performed by requesting device is complete. Controller 50 may then perform the step 118 of retrieving the set of information previously stored regarding the connection between system 20 and the device performing the low priority application and the step 120 of using the set of information to reestablish the communication channel between the system 20 and the device performing the low priority application.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, although interfaces 46 and 48 are both shown as being part of a telematics system 20, it will be appreciated that they can be implemented as a part of different modules that communicate with each other via, for example, a hardwired bus or wireless connection. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A vehicle telematics system, comprising:
   a first network interface configured for connection to a telecommunications network;
   a second network interface that communicates with the first network interface and that is configured for wireless connection to one or more of a plurality of on-board vehicle systems and one or more of a plurality of mobile communications devices to permit the one or more of the plurality of on-board vehicle systems and the one or more of the plurality of mobile communications devices to access the telecommunications network via the first network interface; and,
   a controller configured to:
      receive a request by a first on-board vehicle system of the plurality of on-board vehicle systems to establish a first communication channel between the second network interface and the first on-board vehicle system;
      determine a number of communication channels between the second network interface and the plurality of on-board vehicle systems and between the second network interface and the plurality of mobile communications devices that are in active use;
      identify, if the number meets a predetermined condition relative to a predetermined number, a low priority application of one of a second on-board vehicle system of the plurality of on-board vehicle systems and a first mobile communications device of the plurality of mobile communications devices connected to the second network interface through a second communication channel;
      sever the second communication channel; and,
      establish the first communication channel between the second network interface and the first on-board vehicle system.

2. The vehicle telematics system of claim 1 wherein the controller is configured, in identifying a low priority application, to:
   assign, for each of the number of communications channels that is in active use, a priority value for an application of an on-board vehicle system of the plurality of on-board vehicle systems or a mobile communications device of the plurality of mobile communications devices using the communication channel to thereby obtain a plurality of priority values; and,
   order the plurality of priority values to determine the low priority application.

3. The vehicle telematics system of claim 1 wherein the controller is further configured to:
   store a set of information relating to the connection between the second network interface and the one of the second on-board vehicle system and the first mobile communications device through the second communication channel;
   sever the first communication channel after a task performed by the first on-board vehicle system is complete;
   retrieve the set of information; and,
   use the set of information to reestablish the second communication channel between the second network interface and the one of the second on-board vehicle system and the first mobile communications device.

4. The vehicle telematics system of claim 1 wherein the controller is further configured to:
   assign a first priority value to a task to be performed by the first on-board vehicle system using the first communication channel;
   compare the first priority value to a second priority value associated with the low priority application; and
   maintain the second communication channel if the first priority value meets a predetermined condition relative to the second priority value.

5. The vehicle telematics system of claim 1 wherein the controller is configured, in identifying the low priority application, to determine whether any of the plurality of on-board vehicle systems and the plurality of mobile communications devices are inactive.

6. The vehicle telematics system of claim 1 wherein the controller is configured, in identifying the low priority application, to determine, for each of the number of communications channels that is in active use, an internet protocol address from which an on-board vehicle system of the plurality of on-board vehicle systems or a mobile communications device of the plurality of mobile communications devices is accessing data.

7. The vehicle telematics system of claim 1 wherein the controller is configured, in identifying the low priority application, to determine, for each of the number of communications channels that is in active use, a type of content which an on-board vehicle system of the plurality of on-board vehicle systems or a mobile communications device of the plurality of mobile communications devices is sending or receiving through the communication channel.

8. The vehicle telematics system of claim 1, further comprising a memory defining a data structure associating a priority value with each of a plurality of characteristics associated with use of the second communication channel.

9. A method for controlling access to a plurality of wireless communication channels between a vehicle telematics system and a plurality of on-board vehicle systems and a plurality of mobile communications devices, comprising:
   receiving a request by a first on-board vehicle system of the plurality of on-board vehicle systems to establish a first communication channel between the vehicle telematics system and the first on-board vehicle system;
   determining a number of communication channels between the vehicle telematics system and the plurality of on-board vehicle systems and between the vehicle telematics system and the plurality of mobile communications devices that are in active use;
   identifying, if the number meets a predetermined condition relative to a predetermined number, a low priority application of one of a second on-board vehicle system of the plurality of on-board vehicle systems and a first mobile communications device of the plurality of mobile communications devices connected to the vehicle telematics system through a second communication channel;
   severing the second communication channel; and,
   establishing the first communication channel between the vehicle telematics system and the first on-board vehicle system.

10. The method of claim 9 wherein the identifying step includes:

assigning, for each of the number of communications channels that is in active use, a priority value for an application of an on-board vehicle system of the plurality of on-board vehicle systems or a mobile communications device of the plurality of mobile communications devices using the communication channel to thereby obtain a plurality of priority values; and, ordering the plurality of priority values to determine the low priority application.

11. The method of claim 9, further comprising:

storing a set of information relating to the connection between the vehicle telematics unit and the one of the second on-board vehicle system and the first mobile communications device through the second communication channel;

severing the first communication channel after a task performed by the first on-board vehicle system is complete;

retrieving the set of information; and, using the set of information to reestablish the second communication channel between the vehicle telematics unit and the one of the second on-board vehicle system and the first mobile communications device.

12. The method of claim 9 further comprising:

assigning a first priority value to a task to be performed by the first on-board vehicle system using the first communication channel;

comparing the first priority value to a second priority value associated with the low priority application; and maintaining the second communication channel if the first priority value meets a predetermined condition relative to the second priority value.

13. The method of claim 9 wherein the identifying step includes determining whether any of the plurality of on-board vehicle systems and the plurality of mobile communications devices are inactive.

14. The method of claim 9 wherein the identifying step includes determining, for each of the number of communications channels that is in active use, an internet protocol address from which an on-board vehicle system of the plurality of on-board vehicle systems or a mobile communications device of the plurality of mobile communications devices is accessing data.

15. The method of claim 9 wherein the identifying step includes determining, for each of the number of communications channels that is in active use, a type of content which an on-board vehicle system of the plurality of on-board vehicle systems or a mobile communications device of the plurality of mobile communications devices is sending or receiving through the communication channel.

16. A method for controlling a vehicle telematics system of a vehicle, the vehicle telematics system being configured for cellular data communication with a wireless carrier system and being configured to provide a wireless access point within the vehicle that provides a plurality of wireless communication channels for use by a plurality of local wireless devices that include on-board vehicle systems and mobile communications devices located within the vehicle, the method comprising:

receiving a request by a first local wireless device of the plurality of local wireless devices to establish a first communication channel with the wireless access point, wherein the first local wireless device is a first one of the on-board vehicle systems that requires data communication with the wireless carrier system via the wireless access point;

determining that all of the plurality of wireless communication channels of the wireless access point are in active use, wherein each of the plurality of wireless communication channels has been established between the wireless access point and a different one of the plurality of local wireless devices;

terminating one of the plurality of wireless communication channels that is in active use, thereby making the one wireless communication channel available for subsequent use by the first on-board vehicle system; and establishing the first communication channel between the first on-board vehicle system and wireless access point using the one wireless communication channel.

\* \* \* \* \*